United States Patent [19]
Osuna-Diaz

[11] Patent Number: 5,670,190
[45] Date of Patent: Sep. 23, 1997

[54] VALVE PIN ACTUATION SYSTEM FOR AN INJECTION NOZZLE

[76] Inventor: Jesus` M. Osuna-Diaz, 908 Ravine Terrace Ct., Rochester Hills, Mich. 48307

[21] Appl. No.: 513,353

[22] Filed: Aug. 10, 1995

[51] Int. Cl.⁶ ............................................. B29C 45/23
[52] U.S. Cl. ............................................. 425/564; 425/566
[58] Field of Search ............................ 425/562, 563, 425/564, 565, 566

[56] References Cited

U.S. PATENT DOCUMENTS

| | | | |
|---|---|---|---|
| 3,912,133 | 10/1975 | Hehl | 222/496 |
| 4,373,132 | 2/1983 | Vartanian | 425/566 |
| 4,832,593 | 5/1989 | Brown | 425/564 |
| 5,067,893 | 11/1991 | Osuna-Diaz | 425/564 |
| 5,141,696 | 8/1992 | Osuna-Diaz | 425/562 |

*Primary Examiner*—Tim Heitbrink
*Attorney, Agent, or Firm*—John R. Benefiel

[57] ABSTRACT

An injection nozzle has gearing which drives a valve pin to open and close a mold gate, with a venting chamber in a nozzle body allowing vapors to escape before reaching the gearing to avoid fouling of the gearing. The valve pin is actuated by a hydraulic cylinder driving the gearing, which includes a pair of pinion gears driving gear teeth on either side of the upper end of the valve pin. An adjustable stop is provided limiting piston travel in either direction, allowing adjustment of both the closed and open positions of the valve pin.

7 Claims, 3 Drawing Sheets

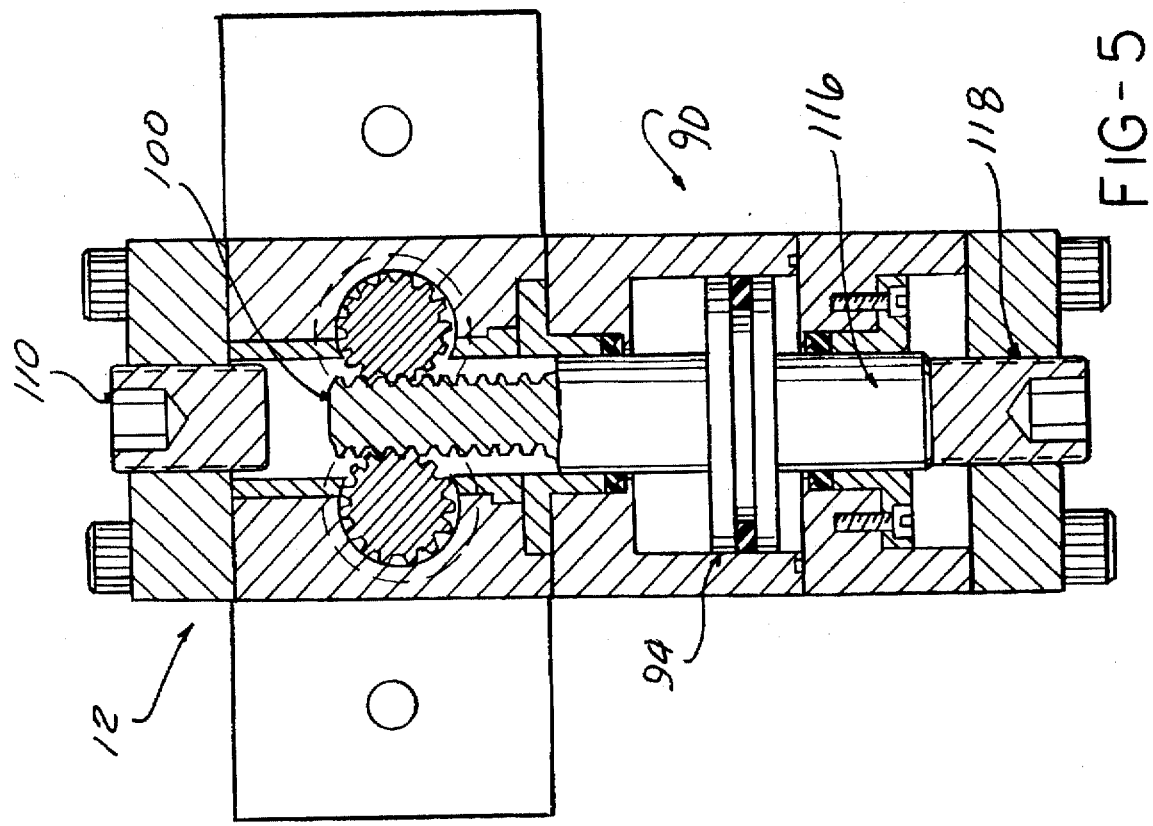
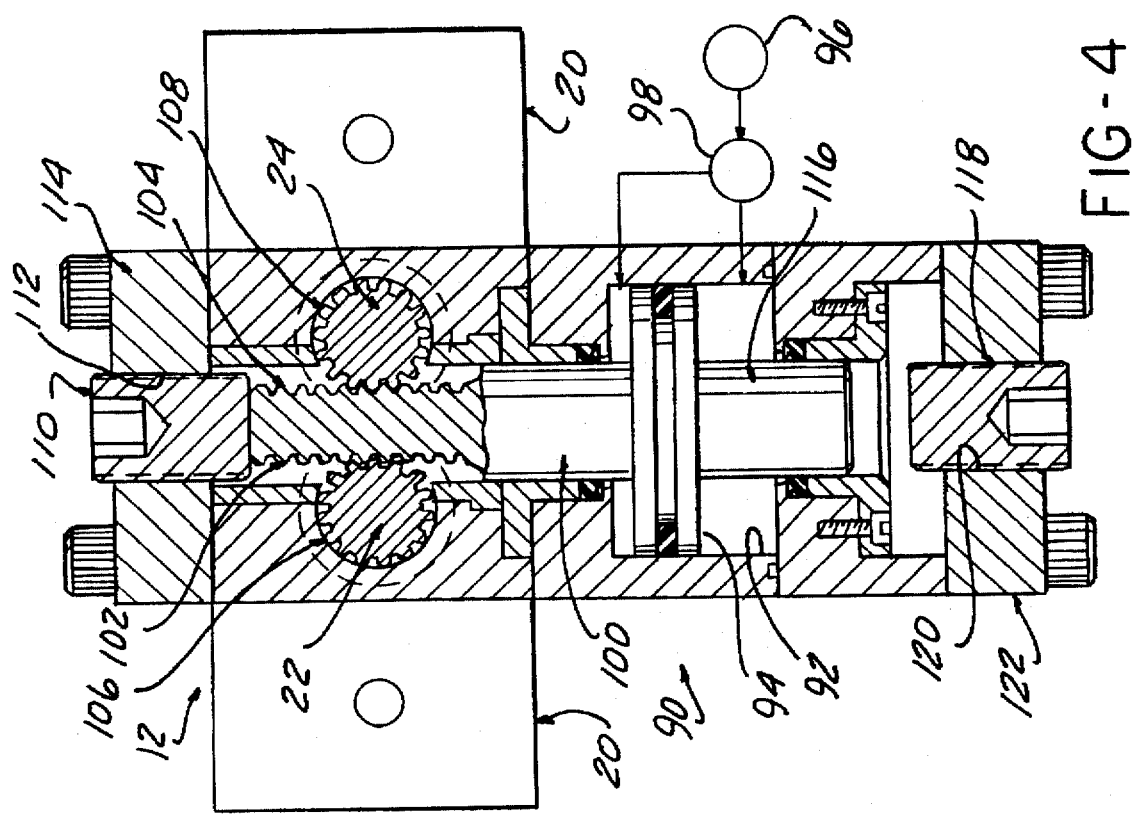

VALVE PIN ACTUATION SYSTEM FOR AN INJECTION NOZZLE

BACKGROUND OF THE INVENTION

This invention concerns injection molding apparatus, and more particularly valve pin actuators for operating an injection nozzle valve pin used to open and close a mold gate at the nozzle tip.

In some configurations of injection molding apparatus, particularly single cavity molds, the injection nozzle through which the hot melt is forced to flow is aligned with a shut off valve pin, and a hot runner passage descends around the valve pin to the mold gate at the tip of the nozzle. The valve pin is positioned aligned with the entrance to the mold cavity, and is actuated to move axially to open and close the mold gate in order to control the flow of hot melt into the mold cavity.

The location of the hot runner passage close to the valve pin creates difficulty in designing an actuator, primarily because of the high temperatures developed close to the valve pin. Hydraulic power-cylinder actuators are not well suited as actuators if closely positioned to the valve pin because hazardous heating of the hydraulic fluid to elevated temperatures may result. Pneumatic power cylinders are too bulky when sized to produce adequate actuating forces.

There has heretofore been developed valve pin actuation systems in which the power cylinder is located to one side, and a pivoted actuator lever transfers motion of the piston to the valve pin.

However, this approach also has difficulties in that the high leverage developed by the lever causes the pivot pins to often be broken. Side loading of the valve pin by the lever also results in many of these designs.

An actuator design shown in U.S. Pat. No. 3,912,133 issued on Oct. 14, 1975 interposes a rack and segment gear drive between lever and pin to reduce side loading, but the swing lever and cylinder are bulky and require substantial space in which to operate.

Adjustment to enable the valve pin to be positioned accurately in the closed position has been impossible to carry out with such mechanisms, and the lack of adjustability requires very precise machining and painstaking assembly of the components to achieve proper pin closing when the cylinder is fully stroked. If wear of the pin or other components results in improper closing, the injection nozzle must be disassembled and repaired.

The present inventor therefore developed the invention shown in U.S. Pat. No. 5,067,893 issued on Nov. 26, 1991 for an "Injection Molding Apparatus with Shut Off Valve Pin Actuation System," which invention has alleviated these problems.

However, even the design shown in U.S. Pat. No. 5,067,893 has not completely solved all problems associated with this difficult application.

In the design shown in U.S. Pat. No. 5,067,893, the valve pin extends up through a sealing bushing, with an enlarged stem portion of the valve pin formed with gear teeth on one side. These teeth are engaged with a pinion gear oscillated by an externally located hydraulic cylinder. Some of the plastic hot melt is vaporized at the high temperatures existing in the injector nozzle, and minute quantities of these vapors can blow by the pin stem in the bushing bore, notwithstanding the tight seal achieved by the sealing bushing.

Injectors are often operated continuously during production, and under some conditions, vapors condensing over a long period of time will accumulate sufficient residue onto the gearing to completely foul the actuator gearing, requiring disassembly and cleaning.

In the design shown in U.S. Pat. No. 5,067,893, a readily executed adjustment of the closing position of the valve pin tip is advantageously enabled.

However, the present inventor has recognized that an adjustment of the opened position of the valve pin may also sometimes be advantageous. If a close clearance is established, the hot melt temperature at the gate can be increased by the friction created by flow through a tight restriction, thus enabling some control over the flow characteristics of the injection in order to establish optimal injection conditions.

Finally, in the aforementioned design, a single bypass passage is provided due to the asymmetry of the gearing drive. Dual symmetrical flow passages could provide improved flow conditions in the injection unit by reducing flow resistance by increasing the effective cross sectional area of the flow path to the nozzle tip.

Accordingly, it is an object of the present invention to provide an improved valve pin actuator for mold injection units which resists fouling of the gearing caused by vapors bypassing the valve pin stem.

It is a further object to provide a valve pin actuator enabling fine adjustment of both the opening and closing position of the valve pin tip.

Another object is to provide a valve pin actuator with an improved flow passage configuration to optimize flow characteristics through the injector unit.

SUMMARY OF THE INVENTION

These and other objects of the present invention are achieved by an injector actuator in which the valve pin is stroked by pinion gearing engaging gear teeth formed along opposite sides of a valve pin stem. The valve pin extends through a flow passage defined around the valve pin, and then through a bore in a sealing bushing. A vent chamber is located just beyond the sealing bushing, a vent passage allowing escape of any bypassing plastic vapor. The valve pin stem extends through a guide bushing into a gearing cavity, with a segment of the valve pin stem formed with a set of gear teeth located above the second bushing. Any escaping vapors exit the vent passage, thus fouling of the gearing is avoided.

A pair of pinion gears are each formed on one end of a respective one of a pair of actuator extension shafts, the pinion gears each engaging a set of gear teeth extending along opposite sides of the upper end of the valve pin stem.

The actuator extension shafts extend out of the mold body to a hydraulic cylinder. The extension shafts extend into the hydraulic cylinder housing and each have pinion gears engaging gear teeth on opposite sides at a piston shaft fixed to a piston of the hydraulic cylinder. Stroking of the piston causes both extension shafts to rotate so as to cause the valve pin to be raised or lowered to the open or closed position in the mold gate. The opposing engagement of the pinion gears neutralizes the side thrust exerted by the gear drive reaction. This minimizes the development of clearances in the bushing guide bores and thus the escape of plastic melt vapors.

The piston also has a second shaft extending axially in the opposite direction from the shaft driving the extension shaft gears. The end of each shaft is driven to abut against a threaded stop so that the piston stroke end point in each direction may be precisely adjusted. This in turn allows close adjustment of both the opened and closed position of the valve pin tip with respect to the mold gate.

A pair of feed flow passages is arranged symmetrically one either side of the valve pin converging on the valve pin surrounding passage immediately above the mold gate to maximize the cross sectional area available for flow of the melt to the mold gate.

DESCRIPTION OF THE DRAWINGS

FIG. 4 is an enlarged side elevational view in partial section of the valve pin actuator unit in the valve pin opened position.

FIG. 5 is the same view of the valve pin actuator unit as shown in FIG. 4 but in the valve pin closed position.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
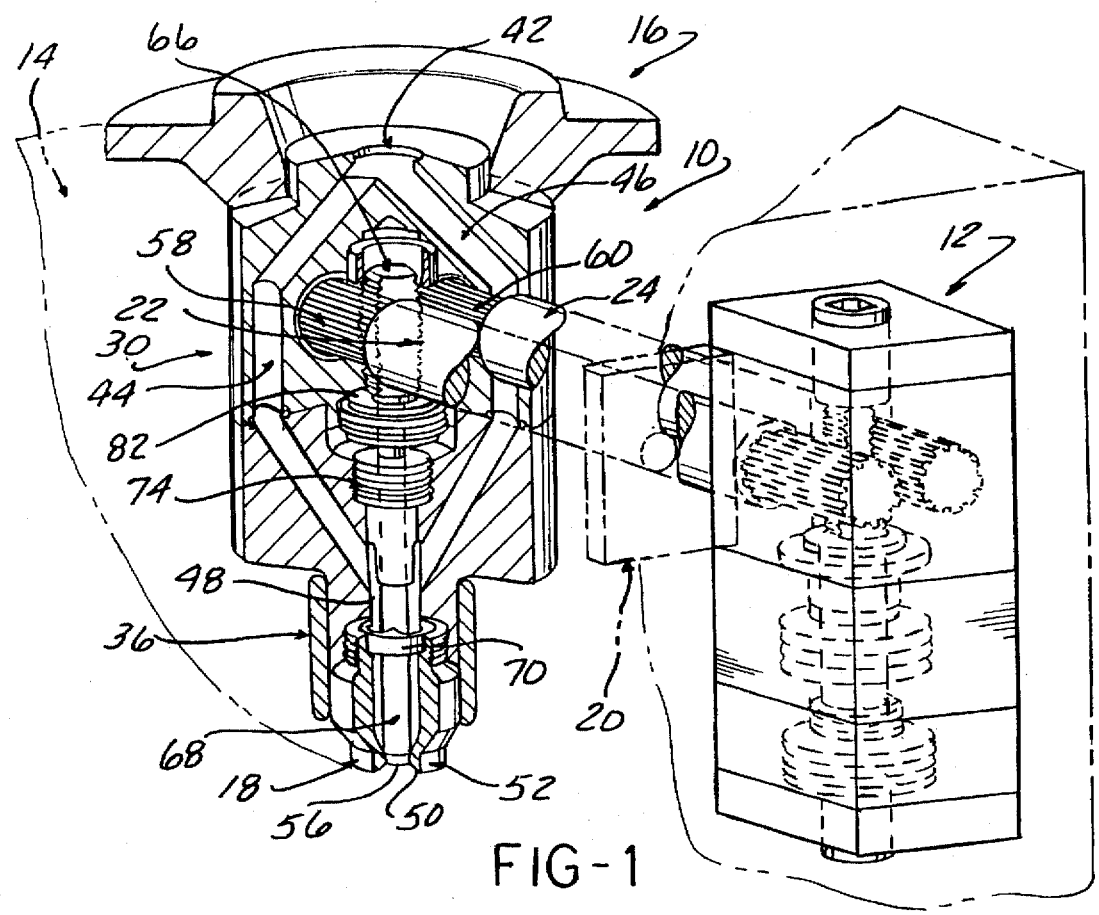
FIG. 1 is a perspective view of a partially sectioned injection nozzle and a valve pin actuator mounted to a mold shown in phantom in fragmentary form.
Figure 2:
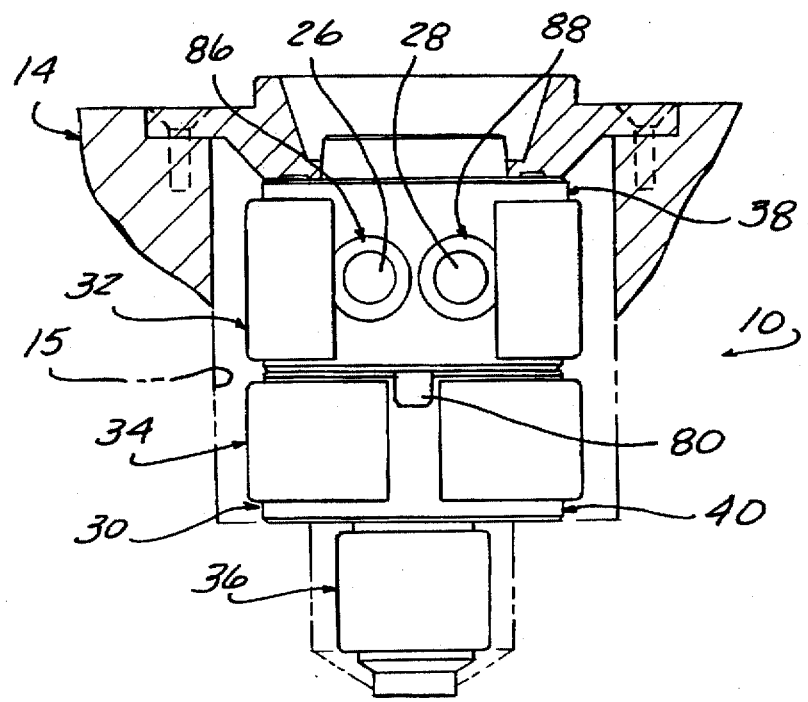
FIG. 2 is a side elevational view of the injector unit shown in FIG. 1, with a fragmentary sectional view of a portion of adjacent mold structure.
Figure 3:
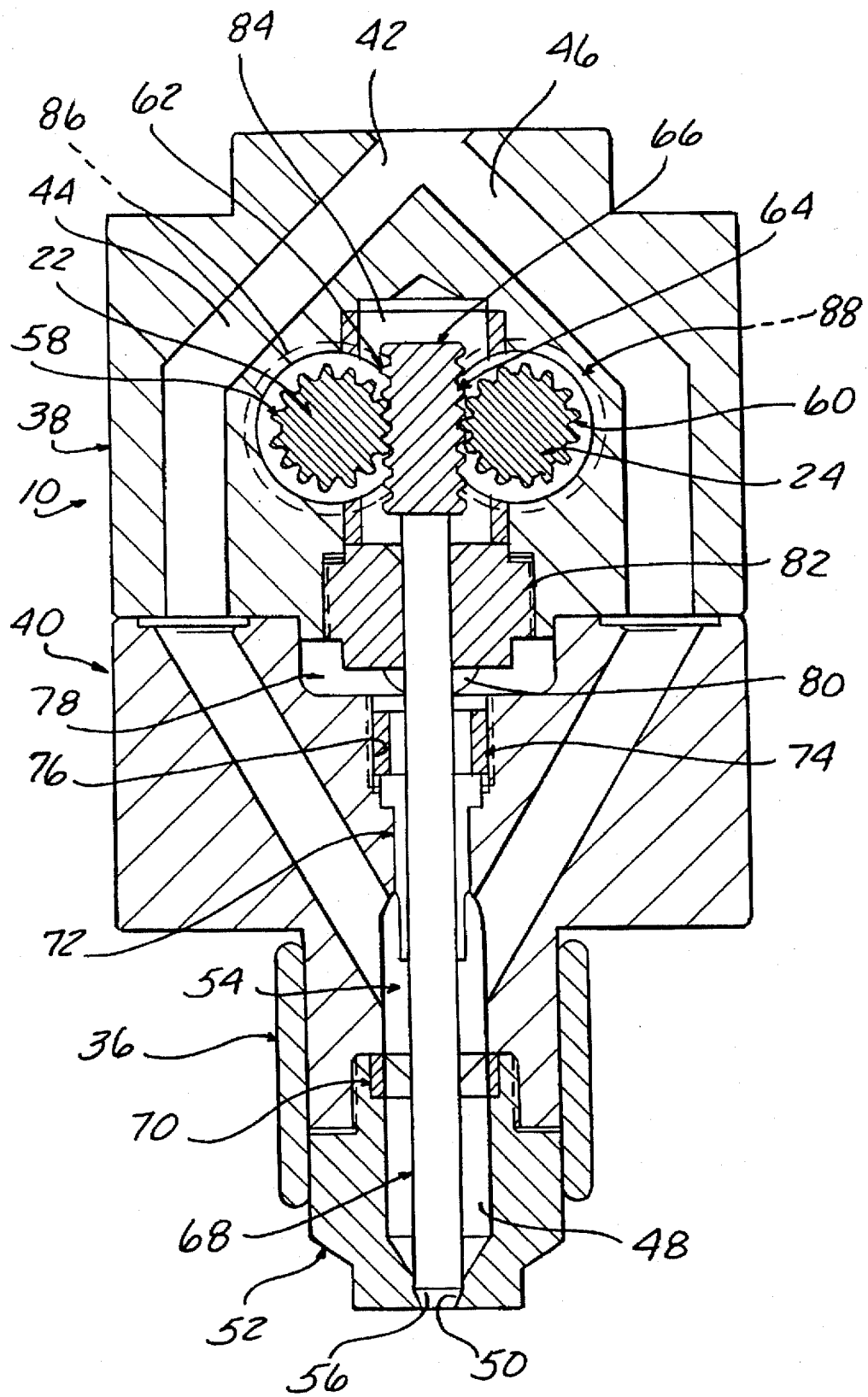
FIG. 3 is an enlarged sectional view of the injector unit shown in FIG. 1.

Referring to FIGS. 1-3, an injection nozzle 10 and a valve pin actuator assembly 12 are shown mounted to a mold plate 14, shown in fragmentary form in phantom lines.

A cap plate 16 is secured to the upper surface of the mold block 14 to hold the injection nozzle 10 in place within a stepped bore 15 in the mold 14 with its tip 18 disposed within an entrance to a mold cavity (not shown).

The actuator assembly 12 is located spaced from the injection nozzle 10, mounted to a lateral face of the mold plate 14, as with flanges 20 and capscrews (not shown).

A pair of extension shafts 22, 24 extend from the actuator assembly to the injection nozzle 10 through a suitable space in the mold plate 14, the shafts 22, 24 received in openings 26, 28 in one side of a nozzle body 30.

The actuator assembly 12 acts to oscillate the extension shafts 22, 24 by means of a double action hydraulic cylinder described below.

Heater coils 32, 34, 36 are mounted against upper and lower sections 38, 40 of the nozzle body 30, the heater coils energized to maintain the proper temperature condition of the hot melt, as is well known in the art.

An injection port 42 at the upper end of the injection nozzle is adapted to receive melted plastic under pressure developed in an injection unit (not shown), which is directed into a pair of flow passages 44, 46 which diverge from the port, extending around the openings 26, 28 which receive one end of a respective extension shaft 22, 24. Passages 44, 46 thereafter converge into a central passage 48 leading to a mold gate 50 formed in a tip insert 52.

An elongated valve pin 54 extends centrally within the nozzle body 30, with a tapered tip portion 56 movable in and out of valve gate 50 to open or close the entrance to the mold cavity.

The extension shafts 22, 24 each have a pinion gear formed at either end. Pinion gears 58, 60 engage a respective set of gear teeth 62, 64 formed on opposite sides of the upper end 66 of the valve pin 54 (best seen in FIG. 3). Oscillation of the extension shafts 22, 24 causes raising and lowering of the valve pin top end 56 to open and close the mold gate 50.

The lower end of the valve pin 64 passes through a central bore in a guide piece 70, which has openings allowing flow of the melt through the guide piece 70. See U.S. Pat. No. 5,141,696 issued on Aug. 25, 1994 to the present inventor for a more detailed description of this component.

The intermediate section of the valve pin 54 is first received into a sealing bushing 72, housing a thin walled lower end disposed in the passage 48, the pressure of the hot melt causing gripping of the outside of the valve pin 54 to establish a tight seal. A threaded retainer 74 is advanced in a threaded bore 76 to press and hold the sealing bushing 72 in position.

A venting chamber 78 is formed by a recess in the top of the lower member 40 of the injector body 38, which is located to collect any vapors bypassing the sealing bushing 72, with a vent passage 80 leading out of the injector body 38 to allow escape of the vapors.

An upper guide bushing 82 receives the upper portion of the valve pin 54 just below the valve stem 66, closing off a cavity 84 accommodating the gearing components.

Bearing sleeves 86, 88 can be provided for the ends of the extension shafts 22, 24 adjacent the pinion gears 58, 60.

FIGS. 4 and 5 show the details of the actuator assembly 12. A multi section cylinder housing 90 has a bore 92 slidably mounting a piston 94.

Either side of the piston 94 defines opposed fluid pressure chambers, alternatively pressurized with hydraulic fluid directed from a source 96, or vented by suitable control valving 98 to enable a double acting mode of operation.

An upper piston shaft 100 has one set of gear teeth 102, 104 formed on opposite sides thereof. The extension shafts 22, 24 each have pinion gears 106, 108 on the ends received in the cylinder housing 90, each meshing with a respective set of gear teeth 102, 104.

An upper stop plug 110 is threaded into a threaded bore 112 in an end cap 114 and aligned with the upper piston shaft 100 so as to abut the end of the piston shaft 100 when the piston 94 is stroked upwardly.

This defines the up or open position of the valve pin tip 56.

An oppositely directed lower stop plug 118 is threaded into a threaded bore 120 in a lower end cap 122.

The piston shaft 116 abuts the lower stop plug 122 when the piston 94 is stroked downwardly as represented in FIG. 5.

In each fully stroked position, the piston 94 has a clearance with each of the endwalls of the bore 92 so that abutment with the respective stop plugs 110, 118 defines the closed and open positions of the valve pin end 56.

Each position at which abutment occurs can be adjusted precisely by threadably adjusting the stop plugs 110, 118 so that both the open and closed positions of the valve pin end can be accurately set.

It may be advantageous to allow a restrictive effect when the valve pin end 56 is open by adjusting the Upper stop plug 110. Flow through the restriction causes heating of the melt which may in some instances improve the injection process by slightly raising the temperature of the melt.

The presence of venting chamber 78 and passage 80 precludes the bypassed vapors from entering the space where the gearing is housed, and thus fouling of the gears is avoided.

The opposing engagement of two pinion gears eliminates the side thrusting on the valve pin to greatly reduce wear and the development of excessive clearance could allow escape of plastic vapors.

The capability for dual adjustment results in easily achievable, precise control over the valve pin open and closed positions.

Finally, the dual, symmetrically arranged feed passages reduce the restrictive effect of a single feed passage, and improve the movement of melt to the mold gate.

I claim:

1. An injection molding apparatus including an injection nozzle having a nozzle body defining a gate through which melt is injected into a mold cavity, a shut off valve pin axially movable within said nozzle body, said valve pin having a tip at one end adapted to be moved to be disposed within the gate of said injection nozzle to close said gate, and moved to be withdrawn from said gate to open said gate;

gearing means drivingly engaged with the opposite end of said valve pin to enable driving of said valve pin axially between said open and closed positions;

said gearing means enclosed within a gearing cavity in said nozzle body;

actuator means for operating said gearing means to cause said valve pin to be moved axially to open or close said mold gate;

said gearing means comprising a set of gear teeth formed on opposite sides of said opposite end of said valve pin and a first pair of pinion gears each engaged with a seat of gear teeth on a respective side of said valve pin, said actuator means enabling oscillation of said pinion gears in opposite directions to axially drive said valve pin in opposite directions.

2. The apparatus according to claim 1 further including a venting chamber in said nozzle body through which said valve pin extends in extending into said gearing cavity enclosing said gearing means, and a vent passage extending out of said nozzle body from said venting chamber to allow vapors bypassing said valve pin to escape without passing into said gearing cavity; and a guide bushing having a bore receiving said valve pin, said guide bushing located between said gearing cavity and said venting chamber.

3. The apparatus according to claim 1 wherein said actuator means includes a hydraulic cylinder having a housing and a piston slidable in a bore in said housing defining a pressure chamber on either side of said piston and a piston shaft extending out of said housing, said shaft having a set of gear teeth on opposite sides thereof, a second pair of pinion gears, each engaged with a respective set of gear teeth on said piston shaft, each one of the pinion gears in said first and second pairs of pinion gears connected to a pinion gear in the other pair by a respective extension shaft extending from said hydraulic cylinder into said injector nozzle body, said hydraulic cylinder spaced away from said injector nozzle body.

4. The apparatus according to claim 3 further including a pair of adjustable positive stops mounted to said hydraulic cylinder and limiting travel of said piston in either axial direction.

5. The apparatus according to claim 1 wherein a pair of flow passages in said injection nozzle body diverge from an injector port in the top of said injection nozzle body and extend around said gear cavity and converge into a single passage surrounding said valve pin above said mold gate.

6. An assembly comprising a mold injection nozzle having a nozzle body formed with a mold gate, a valve pin movable in and out of said gate to close or open said gate, actuator means for moving said valve pin to close or open said gate, said actuator means for moving said valve pin to closed and opened positions with respect to said mold gate including a movable actuator member drivingly connected to said valve pin to move said valve pin between said opened and closed positions, and adjustment means associated with said actuator means to provide selective adjustment of the valve pin position in each of the opened and closed positions comprising first and second adjustable stops, each stop engageable with said movable member upon continued movement in respective directions, said movement causing said valve pin to be moved to said opened and closed positions.

7. The assembly according to claim 6 wherein said actuator means includes a double acting power cylinder including a piston comprising said movable member, said piston adapted to be stroked within a bore in a cylinder house, and drive means causing said valve pin to be moved to said closed and opened position as said piston is stroked in opposite directions, and wherein said adjustment means comprises an adjustable stop located on each side of said piston and adapted to be engaged by said piston upon being stroked in respective directions.

* * * * *